US008516058B2

(12) United States Patent
Stern et al.

(10) Patent No.: US 8,516,058 B2
(45) Date of Patent: Aug. 20, 2013

(54) SYSTEM AND METHOD FOR DYNAMIC TAGGING IN EMAIL (75) Inventors: Edith Helen Stern, Yorktown Heights, NY (US); Patrick Joseph O'Sullivan, Ballsbridge (IE); Robert Cameron Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 11/934,189

(22) Filed: Nov. 2, 2007

(65) Prior Publication Data

US 2009/0119370 A1 May 7, 2009

(51) Int. Cl.
*G06F 15/16* (2006.01)

(52) U.S. Cl.
USPC .......................................... 709/206

(58) Field of Classification Search
USPC .......................................... 709/206
See application file for complete search history.

(56) References Cited

U.S. PATENT DOCUMENTS

| | | | | |
|---|---|---|---|---|
| 5,948,058 A * | 9/1999 | Kudoh et al. | | 709/206 |
| 6,237,040 B1 * | 5/2001 | Tada | | 709/246 |
| 6,718,367 B1 * | 4/2004 | Ayyadurai | | 709/206 |
| 7,086,050 B2 * | 8/2006 | Barton et al. | | 717/173 |
| 7,346,660 B2 * | 3/2008 | Kulkarni | | 709/206 |
| 7,366,762 B2 * | 4/2008 | Cama | | 709/206 |
| 7,421,454 B2 * | 9/2008 | DeShan et al. | | 1/1 |
| 7,558,830 B2 * | 7/2009 | Cama | | 709/206 |
| 7,689,563 B1 * | 3/2010 | Jacobson | | 707/663 |
| 7,730,078 B2 * | 6/2010 | Schwabe et al. | | 707/758 |
| 2001/0042099 A1 * | 11/2001 | Peng | | 709/206 |
| 2004/0111478 A1 * | 6/2004 | Gross et al. | | 709/206 |
| 2004/0167963 A1 * | 8/2004 | Kulkarni | | 709/206 |
| 2004/0199587 A1 * | 10/2004 | McKnight | | 709/206 |
| 2005/0120108 A1 * | 6/2005 | Wisniewski et al. | | 709/224 |
| 2006/0031347 A1 | 2/2006 | Sahi | | |
| 2006/0036696 A1 * | 2/2006 | Maresh | | 709/206 |
| 2006/0112130 A1 | 5/2006 | Lowson | | |
| 2007/0005576 A1 * | 1/2007 | Cutrell et al. | | 707/3 |
| 2007/0100829 A1 * | 5/2007 | Allen et al. | | 707/9 |
| 2007/0143298 A1 * | 6/2007 | Surendran et al. | | 707/10 |
| 2008/0040674 A1 * | 2/2008 | Gupta | | 715/745 |
| 2008/0104032 A1 * | 5/2008 | Sarkar | | 707/3 |
| 2008/0140619 A1 * | 6/2008 | Srivastava et al. | | 707/3 |
| 2008/0168135 A1 * | 7/2008 | Redlich et al. | | 709/204 |
| 2008/0187279 A1 * | 8/2008 | Gilley et al. | | 386/52 |
| 2009/0006285 A1 * | 1/2009 | Meek et al. | | 706/12 |
| 2009/0006556 A1 * | 1/2009 | Agarwal et al. | | 709/206 |
| 2009/0077062 A1 * | 3/2009 | Spivack et al. | | 707/5 |
| 2009/0077089 A1 * | 3/2009 | Safo et al. | | 707/10 |
| 2009/0077124 A1 * | 3/2009 | Spivack et al. | | 707/103 Y |
| 2009/0094520 A1 * | 4/2009 | Kulas | | 715/723 |
| 2009/0106370 A1 * | 4/2009 | Dreyfus et al. | | 709/206 |

OTHER PUBLICATIONS http://www.taglocity.com, downloaded Feb. 21, 2012, p. 1.

(Continued)

*Primary Examiner* — Waseem Ashraf
(74) *Attorney, Agent, or Firm* — Holland & Knight LLP; Brian J. Colandreo, Esq.; Jeffrey T. Placker, Esq.

(57) ABSTRACT

A method and computer program product for dynamically sharing tags associated with an email including associating one or more tags with an email after the email has been sent. The one or more tags are made accessible to at least a portion of one or more email users.

12 Claims, 8 Drawing Sheets

(56) References Cited

OTHER PUBLICATIONS http://www.google.com/search?hl=en&lr=&q=folksonomy+for+mail&btnG=Search, Oct. 6, 2008, pp. 1-33.
http://www.personalinfocloud.com/2005/02/explaining_and_.html/, downloaded Feb. 21, 2012, pp. 1-19.
http://confluence.atlassian.com/display/DISC/Folksonomy+-+Free+Tagging, downloaded Feb. 21, 2012, pp. 1-3.
http://www.betaversion.org/~stefano/linotype/news/85/, Apr. 5, 2005, pp. 1-4.
http://www.infoworld.com/article/05/07/20/30OPstrategic_1.html, downloaded Feb. 21, 2012 pp. 1.

* cited by examiner

SYSTEM AND METHOD FOR DYNAMIC TAGGING IN EMAIL

TECHNICAL FIELD

This disclosure relates to email communications and, more particularly, to systems and methods for tagging email messages and sharing the tags amongst email users.

BACKGROUND

The ease and low cost of electronic communications has resulted in an explosion of transmitted information. Individuals, particularly corporate users, are subject to an ever increasing volume of email. Email users, especially those with broad interest or job scope, may receive hundreds of emails daily. All of these emails must be sorted through in order to prioritize those communications that demand attention and eliminate those that have no value to the recipient. Additionally, emails need to be cataloged, categorized, or sorted so that they can be readily accessed at a later time. It is desirable to perform all of these tasks in an efficient manner.

Typical solutions for handling email include viewing inbound mail by priority; for example, by color coding inbox views based on the email sender. Email is often analyzed based on content and manually or automatically assigned tags, or attributes to better allow future reference. A user may often manually examine and pigeonhole email, assigning tags, or filing the email in named folders. Storing email can also be done by algorithm based on time, source, topic. Machine learning algorithms can study an email user's patterns and recommend information storage schemes, or inbound attention priority schemes. These suffer from various problems, for example, not all mail from a source may have the same connotations of urgency, topic, or importance. Manual methods for handling email are slow and effortful. While faster, and requiring less effort on the part of the user, automated analysis may fail when email correspondents are uninformed or overdramatic (e.g., when the email is written to dramatize a situation which is not dramatic, or encourage action which is unnecessary). Additionally, machine learning can reinforce poor patterns of information management, learning from the email user's errors as well as her successes. Furthermore, as users collaborate with their colleagues, it is often discovered that initial sorting, or attribute tagging may be wrong, for example, as the user comes to better understands an evolving situation.

As a result of increasing email volume and slow and ineffective methods for handling received email, accessing email once received can also be difficult. The sheer volume of email can overwhelm even cleverly conceived storage pattern. Similarly, with high volumes of information even well crafted email search engines can provide too many responses, as well as being unreflective of the context in which the mail was received.

SUMMARY OF THE DISCLOSURE

In a first implementation, a method includes associating one or more tags with an email after the email has been sent. The one or more tags are made accessible to at least a portion of one or more email users.

One or more of the following features may be included. The one or more tags may be stored in a tag repository. The one or more tags may be embedded with the email. Associating the one or more tags with the email may include editing one or more tags associated with the email.

Making the one or more tags accessible may include updating the one or more tags associated with the email based upon, at least in part, an email user activity. Additionally/alternatively, making the one or more tags accessible may include updating the one or more tags associated with the email on a predetermined schedule. Making the one or more tags accessible to at least a portion of the one or more email users may include restricting access to at least a portion of the one or more tags by at least a portion of the one or more email users.

The method may further include prioritizing at least a portion of the one or more tags associated with the email. Prioritizing at least a portion of the one or more tags may include prioritizing at least a portion of the one or more tags based upon, at least in part, a tag originator. Additionally/alternatively, prioritizing at least a portion of the one or more tags may include prioritizing at least a portion of the one or more tags based upon, at least in part, a content of at least one of the one or more tags.

According to another implementation, a computer program product may reside on a computer readable medium having a plurality of instructions stored thereon. When executed by a processor, the plurality of instructions cause the processor to perform operations including associating one or more tags with an email after the email has been sent. The one or more tags are made accessible to at least a portion of one or more email users.

One or more of the following features may be included. The one or more tags may be stored in a tag repository. Additionally/alternatively, the one or more tags may be embedded with the email. The instructions for associating the one or more tags with the email may include instructions for editing one or more tags associated with the email.

The instructions for making the one or more tags accessible may include instructions for updating the one or more tags associated with the email based upon, at least in part, an email user activity. Additionally/alternatively, the instructions for making the one or more tags accessible may include instructions for updating the one or more tags associated with the email on a predetermined schedule. The instructions for making the one or more tags accessible to at least a portion of the one or more email users may include instructions for restricting access to at least a portion of the one or more tags by at least a portion of the one or more email users.

The computer program may further include instructions for prioritizing at least a portion of the one or more tags associated with the email. The instructions for prioritizing at least a portion of the one or more tags may include instructions for prioritizing at least a portion of the one or more tags based upon, at least in part, a tag originator. The instructions for prioritizing at least a portion of the one or more tags may include instructions for prioritizing at least a portion of the one or more tags based upon, at least in part, a content of at least one of the one or more tags.

The details of one or more implementations are set forth in the accompanying drawings and the description below. Other features and advantages will become apparent from the description, the drawings, and the claims.

DETAILED DESCRIPTION

Figure 1:
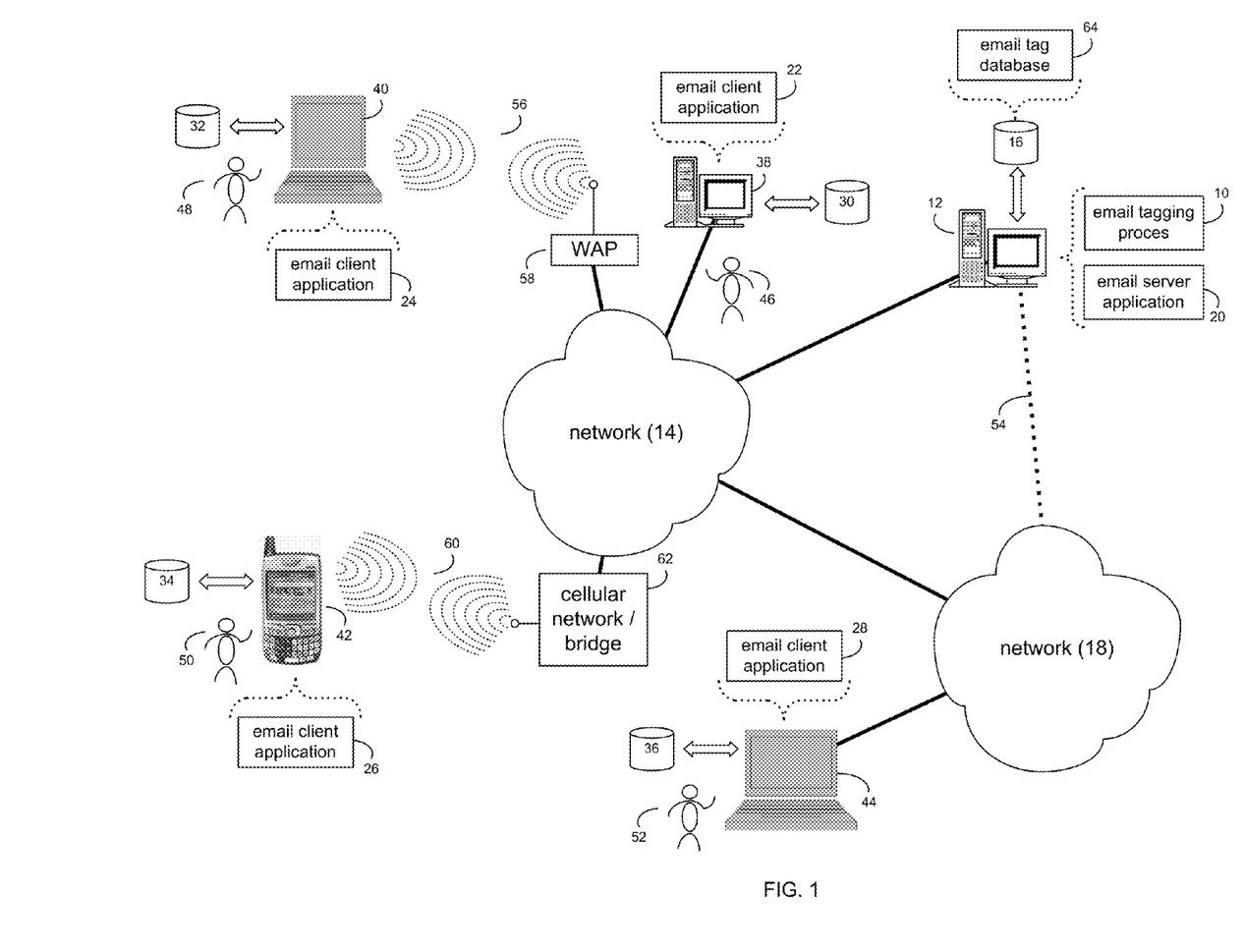
FIG. 1 diagrammatically depicts an email tagging process, an email server application, and an email client application coupled to a distributed computing network.

Referring to FIG. 1, there is shown email tagging process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Alternatively, email tagging process may reside on a client electronic device, such as a personal computer, notebook computer, personal digital assistant, or the like. As will be discussed below in greater detail, email tagging process 10 may allow dynamic tags to be associated with an email. Email users may access the dynamic tags, which may change over time as the dynamic tag are edited by email users and/or new dynamic tags are added. The email users may include an email sender, direct email recipients, and future email recipients.

The instruction sets and subroutines of email tagging process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino™ Server and Microsoft Exchange™ Server. Mail server application 20 may be a mail transfer agent that may store and route email to one or more email client applications 22, 24, 26, 28, examples of which may include but are not limited to Lotus Notes™ and Microsoft Outlook™ Email tagging process 10 may be a stand alone application that interfaces with email server application 20 or an applet/application that is executed within email server application 20.

The instruction sets and subroutines of email server application 20, which may be stored on storage device 16 coupled to server computer 12 may be executed by one or more processors (not shown) and one or more memory architectures (not shown) incorporated into server computer 12.

In addition/as an alternative to being a server-based application residing on server computer 12, the email tagging process may be a client-side application residing on a storage device (e.g., stored on storage devices 30, 32, 34, 36) coupled to one or more client electronic devices (e.g., client electronic devices 38, 40, 42, 44, respectively). As a client-side application, the email tagging process may, for example, be a stand alone application that may interface with an email client application, or may be an applet/application that is executed within email client application. Accordingly, email tagging process may be a server-side process, a client-side process and/or may be a hybrid client-side/server-side process, which may be executed, in whole or in part, by a client electronic device and by a server computer.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of computing devices 38, 40, 42, 44 may include, but are not limited to, personal computer 38, laptop computer 40, personal digital assistant 42. notebook computer 44, a data-enabled, cellular telephone (not shown), and a dedicated network device (not shown), for example. Using email client applications 22, 24, 26, 28, users 46, 48, 50, 52 may access email server application 20 and may send, retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Email Tagging Process

Figure 2:
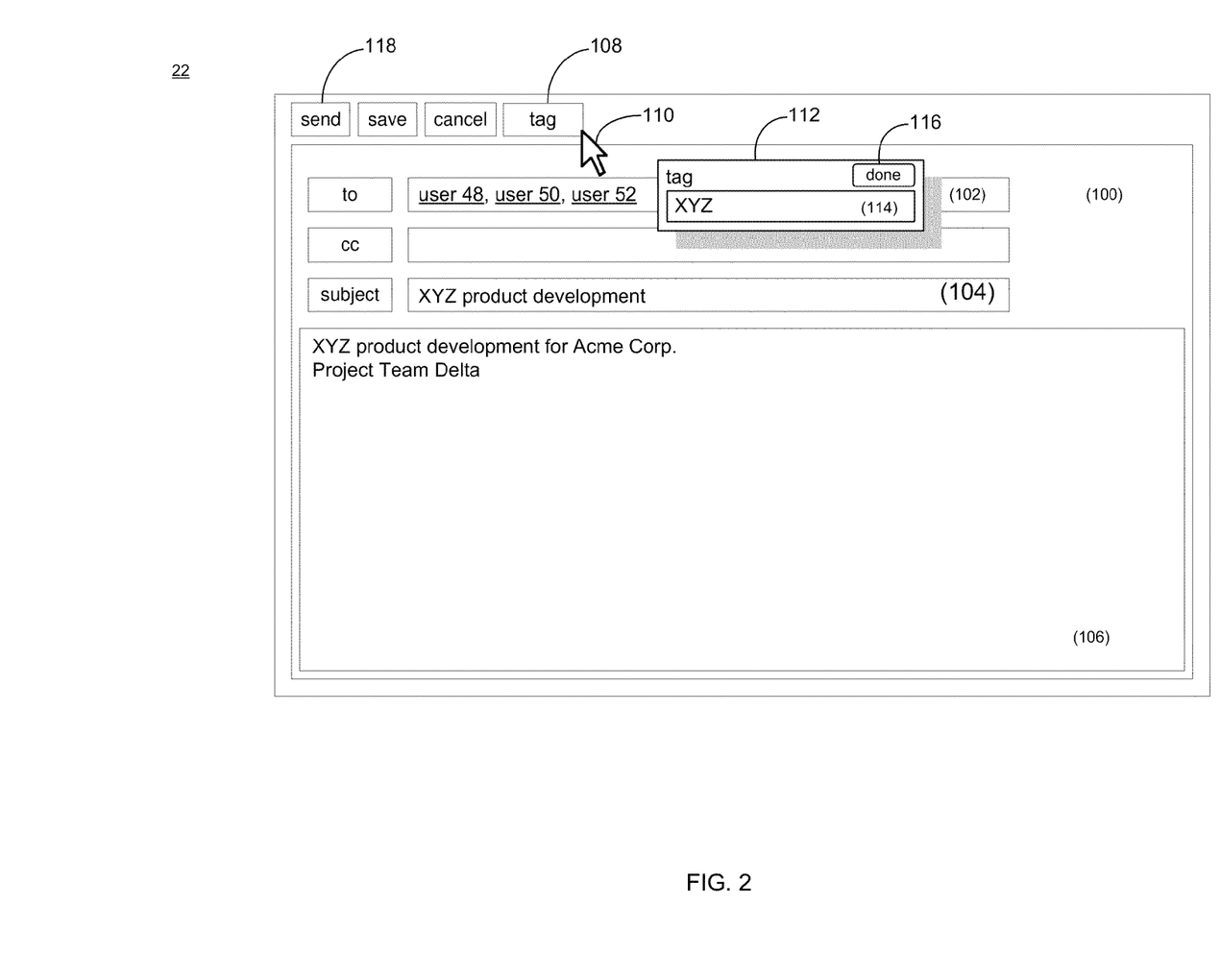
FIG. 2 is a diagrammatic view of an email user interface rendered by the email tagging process, email server application, and/or the email client application of FIG. 1

Referring also to FIG. 2, email client application 22 may allow user 46 to create and send an email through email user interface 100 rendered by email client application 22 and/or email server application 20. Through email user interface 100, user 46 may generate an email to one or more users (e.g., user 48, user 50, and user 52). When creating the email, user 46 may input (e.g., using a keyboard, contacts list, or similar mechanism; not shown) the email addresses of the one or more users (namely, user 48, user 50, and user 52) in "to" field 102. Similarly, user 46 may provide the subject of the email (e.g., "XYZ product development") in "subject" field 104, and the contents of the email in email body 106. When creating the email, user 46 may associate a tag with the email. For example, user 46 may select "tag" button 108 using on-screen pointer 110 controlled by a pointing device (e.g., a mouse; not shown). Selecting "tag" button 108 may result in email tagging process 10, email client application 22, and/or email server application 20 rendering pop-up 112. Pop-up 112 may include tag input field 114, in which user 46 may input (e.g., using a keyboard; not shown) a tag (e.g., tag "XYZ) associated with the email (e.g., identifying the product discussed in the email). Once user 46 has completed creating the tag "XYZ", user 46 may select "done" button 116 in pop-up 112 to save the tag "XYZ" associated with the email.

Associating the tag with the email may include embedding the tag in the email. Additionally/alternatively, associating the tag with the email may include embedding a reference to the tag in the email. The tag itself may be stored locally (e.g., on storage device 30 coupled to client electronic device 38 on which email client application 22 is executed). In a further embodiment, the tag may be stored in a tag repository, for example, on a server computer accessible by email server application 20 and/or email client applications 22, 24, 26, 28. For example, the tag may be stored in email tag database 64 associated with server computer 12 (e.g., residing on storage device 16 coupled to server computer 12). Email tag database 64 may be, for example, a relational database.

Once user 46 has completed creating the email and associating any desired tags (e.g., tag "XYZ") with the email, user 46 may send the email by selecting "send" button 118 in email user interface 100. Selecting "send" button 116 may result in email server application 20 and/or email client application 22 sending the email to the one or more users identified in "to" field 102 (namely, user 48, user 50, and user 52).

Figure 3:
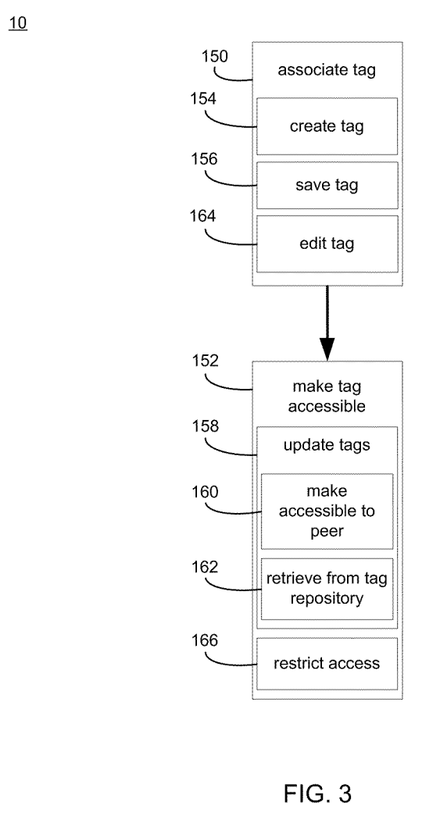
FIG. 3 is a flowchart of a process executed by the email tagging process of FIG. 1.

Referring also to FIG. 3, email tagging process 10 may allow a user to associate 150 one or more tags with an email after the email has been sent. Additionally, email tagging process 10 may make 152 at least a portion of the one or more tags accessible to at least a portion of one or more email users. In this manner, email tagging process may allow for dynamic tags in email. The dynamic tags may be associated 150 with an email message and may be accessible 152 by at least a portion of one or more email users including, for example, an email sender, original email recipients and subsequent email recipients.

Figure 4:
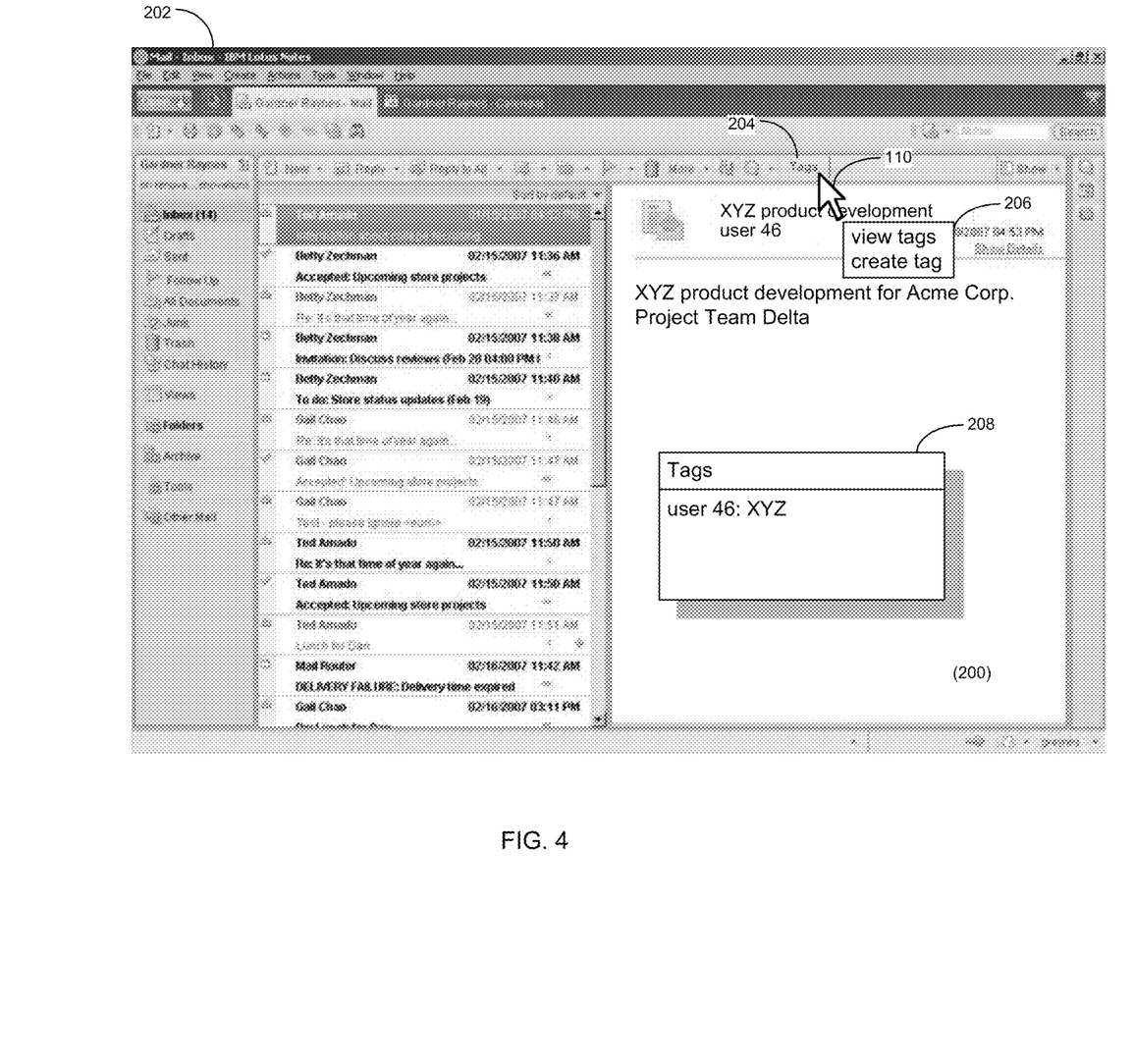
FIG. 4 is a diagrammatic view of an email client interface rendered by the email tagging process, email server application, and/or the email client application of FIG. 1.

Continuing with the above stated example, and referring also to FIG. 4, user 48 may receive email 200 from user 46, which may be rendered by email client application 24 and/or email server application 20 in email client interface 202. Through email client interface 200, user 48 may read email 200 received from user 46. Additionally, user 48 may check to see if any tags have been associated with email 200. For example, user 48 may select "tag" button 204 in email client interface 202 using on-screen pointer 110. Alternatively, email tagging process 10 may indicate that one or more tags are associated 150 with email 20, e.g., without requiring the user to actively check for tags. Selecting "tag" button 204 may result in tagging process 10, email server application 20, and/or email client application 24 rendering pop-up window 206. While pop-up window 206 is shown to include only two options, namely "view tags" and "create tag", this is for illustrative purposes only and is not intended to be a limitation of this disclosure, as the number of options included within pop-up window 206 may be increased or decreased depending on the design criteria and user need.

User 48 may select "view tags" option in pop-up window 206 using on-screen pointer 110 to view tags associated with email 200. For example, upon selecting "view tags" option in pop-up window 206, email tagging process 10, email server application 20, and/or email client application 24 may render tag window 208. Tag window 208 may display the tag "XYZ" created by user 46. Additionally, tag window 208 may indicate that the tag "XYZ" was created by user 46 (i.e., the tag originator). To display the tag "XYZ" and the tag originator (i.e., user 46), email tagging process 10, email server application 20, and/or email client application 24 may access the relevant tag. If the tag "XYZ" is embedded in email 200, the tag may be accessed directly from the email. In an embodiment in which the tag "XYZ" was saved locally on client electronic device 38 through which user 46 accessed email client application 22, email tagging process 10 may make the tag "XYZ" accessible to a peer, e.g., based upon a pointer embedded in email 200 indicating that the tag "XYZ" is locally saved on client electronic device 38. Similarly, in an embodiment in which the tag "XYZ" was saved in email tag database 64, email tagging process 10 may retrieve the tag from email tag database 64, e.g., based upon a pointer embedded in email 200 indicating that the tag "XYZ" is saved in email tag database 64.

In addition to viewing the tag created by user 46, user 48 may associate 150 a tag of his own with email 200 (which was previously sent by user 46). For example, and referring also to FIG. 5, user 48 may select "tag" button 204 in email client interface 202 using on-screen pointer 110. As described above, selecting "tag" button 204 may result in tagging process 10, email server application 20, and/or email client application 24 rendering pop-up window 206 including the options "view tags" and "create tag". User 48 may select the option "create tag" resulting in email tagging process 10, email server application 20, and/or email client application rendering pop-up 112, including tag input field 114. Through pop-up 112 and tag input field 114, user 48 may create 154 a tag that may be associated 150 with email 200. For example, Acme Corp., may be an account managed by user 48. As such, user 48 may create 154 the tag "Acme Corp." to be associated 150 with email 200. Once user 48 has created 154 the tag "Acme Corp.", user 48 may select "done" button 116 using on-screen pointer 110, resulting in email tagging process 110 saving 156 the tag "Acme Corp." associated 150 with email 200.

Figure 5:
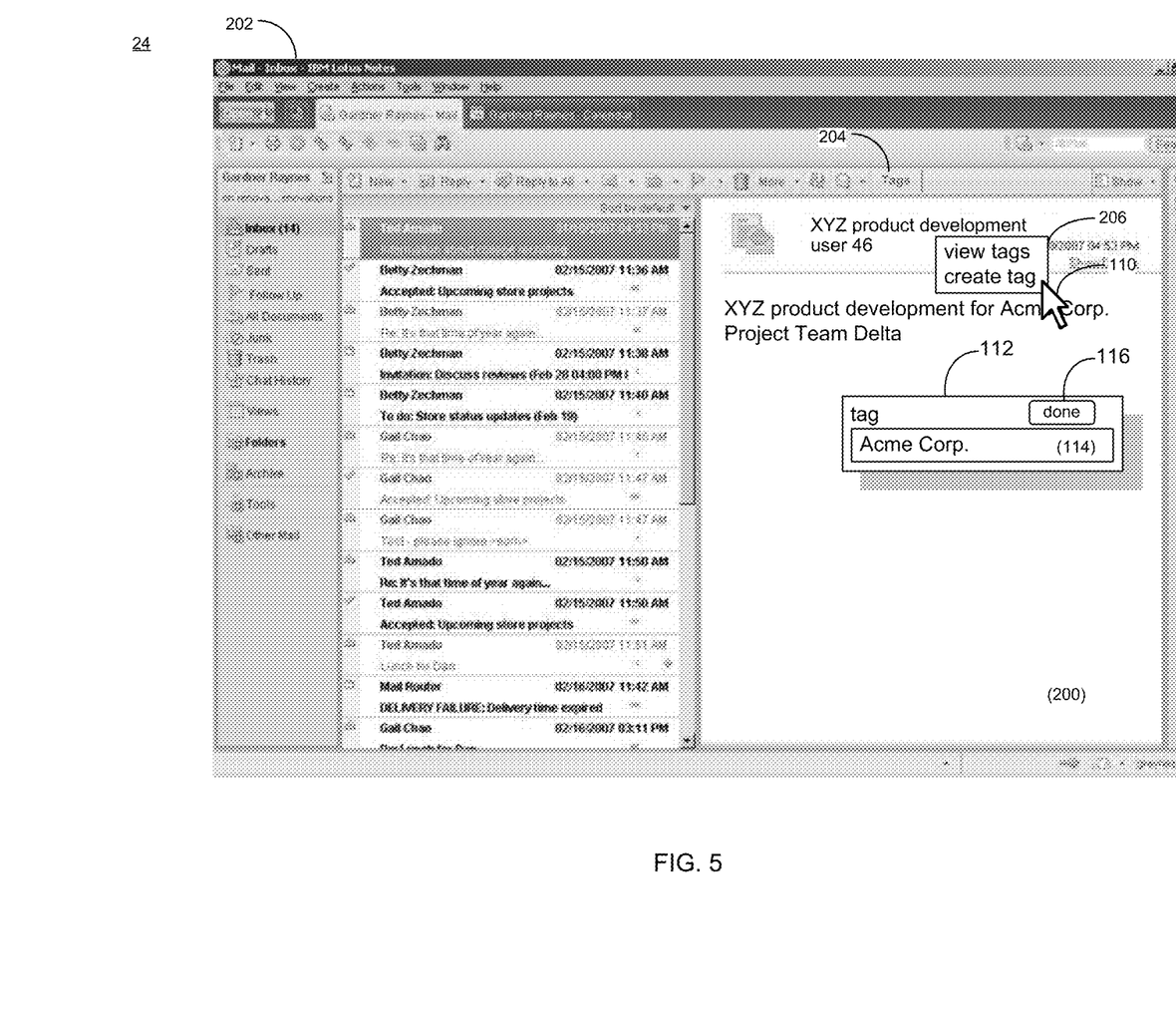
FIG. 5 is a diagrammatic view of an email client interface rendered by the email tagging process, email server application, and/or the email client application of FIG. 1.

As discussed above, associating 150 the tag "Acme Corp." may include saving 156 the tag "Acme Corp." locally on client electronic device 40. Alternatively, associating 150 the tag "Acme Corp." may include saving 156 the tag "Acme Corp." in an email tag repository (e.g., email tag database 64 residing on server computer 12). Saving 156 the tag "Acme Corp." either locally on client electronic device 40 or in email tag database 64 may include embedding a pointer to the tag location in email 200.

Figure 6:
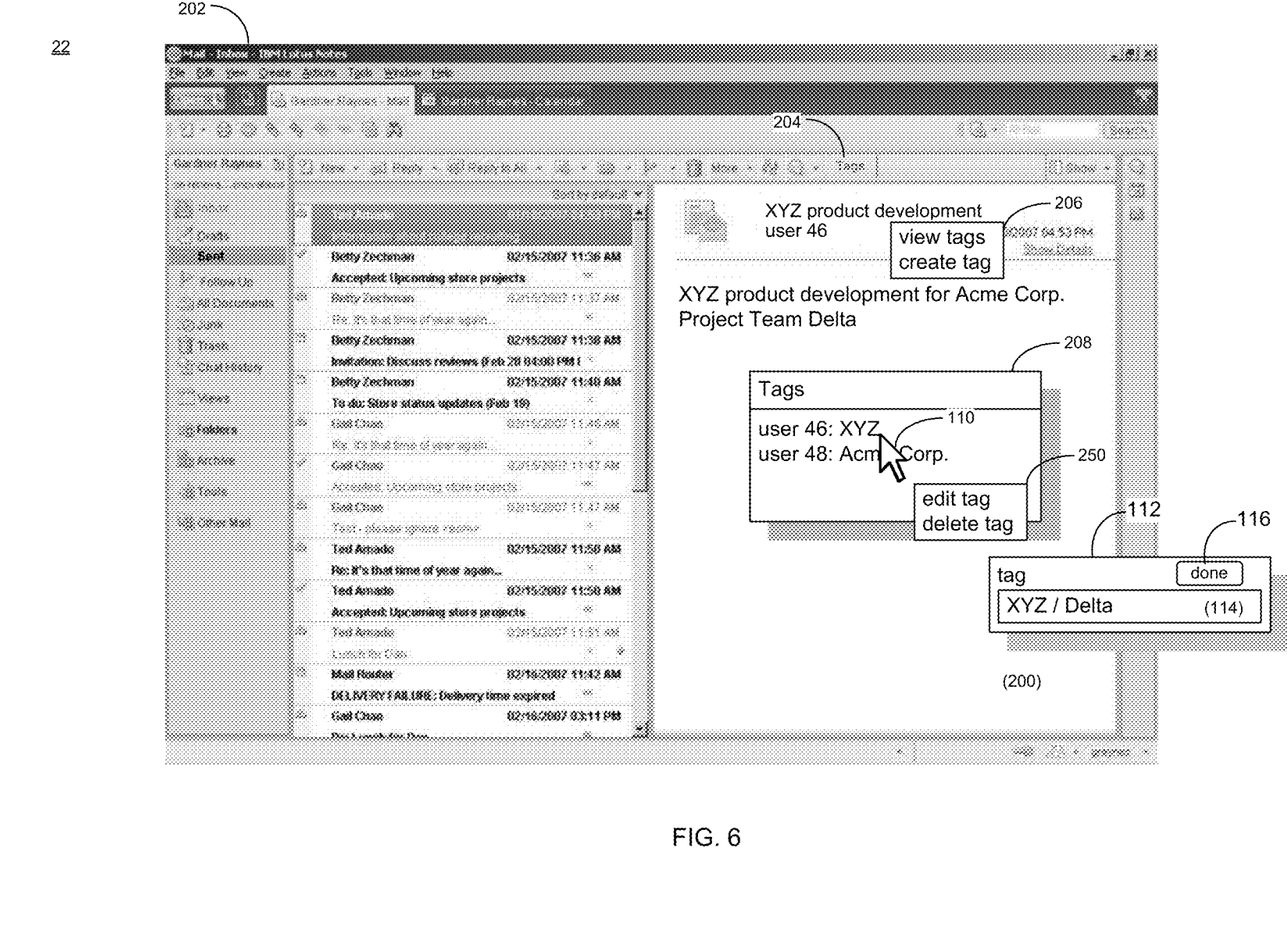
FIG. 6 is a diagrammatic view of an email client interface rendered by the email tagging process, email server application, and/or the email client application of FIG. 1.

Continuing with the above-stated example and referring also to FIG. 6, user 46 may view email 200 in email client interface 202 (e.g., rendered by email server application 20 and/or email client application 22) after having sent email 200, e.g., by viewing email 200 from the "sent" items folder of email client interface 202. While viewing email 200, user 46 may select "tags" button 204 in email client interface 202 using on-screen pointer 110. Selecting "tags" button 204 may, as described above, result in email tagging process 10, email server application 20, and/or email client application 22 rendering pop-up window 206, including the two options "view tags" and "create tag". User 46 may select the "view tags" option using on-screen pointer 110 resulting in email tagging process 10, email server application 20, and/or email client application 22 rendering tag window 208 to make 152 the tags associated 150 with email 200 (i.e., tags "XYZ" and "Acme Corp.") accessible to user 46.

Making 152 the one or more tags accessible may include updating 158 the one or more tags associated 150 with the email based upon, at least in part, an email user activity. Updating 158 the one or more tags may include, for example, querying email tag database 64 to determine what, if any, tags are associated with email 200 (e.g., based upon an identifier for email 200). Similarly, updating 158 the one or more tags associated 150 with email 200 may include querying various email client applications (e.g., email client applications 22, 24, 26, 28) identified (e.g., by email server application 20) as having received email 200, to identify what, if any, tags are associated 150 with email 200 (e.g., that may be locally stored). Additionally, updating 158 the one or more tags associated 150 with email 200 may include referencing any pointers to, or actual tags embedded within email 200 to determine the presence of tags associated 150 with email 200.

As mentioned, updating 158 the one or more tags associated 150 with the email may be based upon, at least in part, an email user activity. The email user activity may include, but is not limited to, e.g., selecting "view tags" option, opening email 200, launching email client application, as well as various other user activities. Similarly, making the one or more tags accessible may include updating 158 the one or more tags associated 150 with the email on a predetermined schedule. The predetermined schedule may include, for example, a time-wise schedule (e.g., hourly), and event-wise schedule (e.g., every other time email client application is launched), etc.

Email tagging process 10, email server application 20, and/or email client application 22 may render the tags associated 150 with email 200 by retrieving 160 the tags and making the tags accessible to a peer, e.g., from one or more client electronic devices (e.g., client electronic device 40), and/or retrieving 162 the tags from a tag repository (e.g., email tag database) based upon, at least in part, updated 158 tag information. It should be noted that the one or more tags associated 150 with the email may be stored according to different schemes. Continuing with the above-stated example, the tag "XYZ" may be stored locally on client electronic device 38, while the tag "Acme Corp." may be stored in email tag database 64 residing on server computer 12. The retrieved tags "XYZ" and "Acme Corp." may be rendered in tag window 20 along with the originator of each tag.

Associating 150 the one or more tags with the email may include editing 164 one or more tags associated 150 with the email. Continuing with the above-stated example, user 46 may wish to elaborate on the previously associated tag "XYZ" to indicate the project team associated with the product XYZ, namely, "Project Team Delta." User 46 may select the tag "XYZ" using on-screen pointer 110 and may, for example, right-click the pointing device (e.g., the mouse; not shown) resulting in email tagging process 10, email server application 20, and/or email client application 22 rendering pop-up window 250. While pop-up window 250 is shown to include only two options, namely "edit tag" and "delete tag", this is for illustrative purposes only and is not intended to be a limitation of this disclosure, as the number of options included within pop-up window 250 may be increased or decreased depending on the design criteria and user need.

Email tagging process 10 may allow user 46 to select "edit tag" option using on-screen pointer 110. Selecting "edit tag" option may result in email tagging process 10, email server application 20, and/or email client application rendering pop-up 112 including tag input field 114. Email tagging process 10 may allow user 46 to edit 164 the tag "XYZ", e.g., to include the project team "Delta". Once user 46 has edited the tag, user 46 may select "done" button 116 to save 156 the edited 154 tag "XYZ/Delta", thereby associating 150 the tag "XYZ/Delta" with email 200. Email tagging process 10 may be configured to allow a user to edit 154 a tag that the user previously created. Additionally/alternatively email tagging process 10 may be configured to allow a user to edit 154 a tag created by another user, by another user in the same department, a tag created by a subordinate, or any other configuration of editing permissions based on design decisions. In this regard, email tagging process 10 may allow user 46, and/or a third party (e.g., an administrator) to establish a policy defining rights and/or controls (e.g., permissions) as to who may edit and/or remove tags. For example, rights and/or controls for editing and/or removing tags may be based upon hierarchal position of a user, department, or the like (e.g., by reference to a corporate directory). Permissions to edit and/or remove tags may be placed with managers, administrators, users having a hierarchal position higher than the originating user of the tag, or other users as may be defined by the policy. Additionally, a user may establish a policy as to who may edit and/or remove tags (e.g., by identifying specific users, hierarchal position, or the like).

Figure 7:
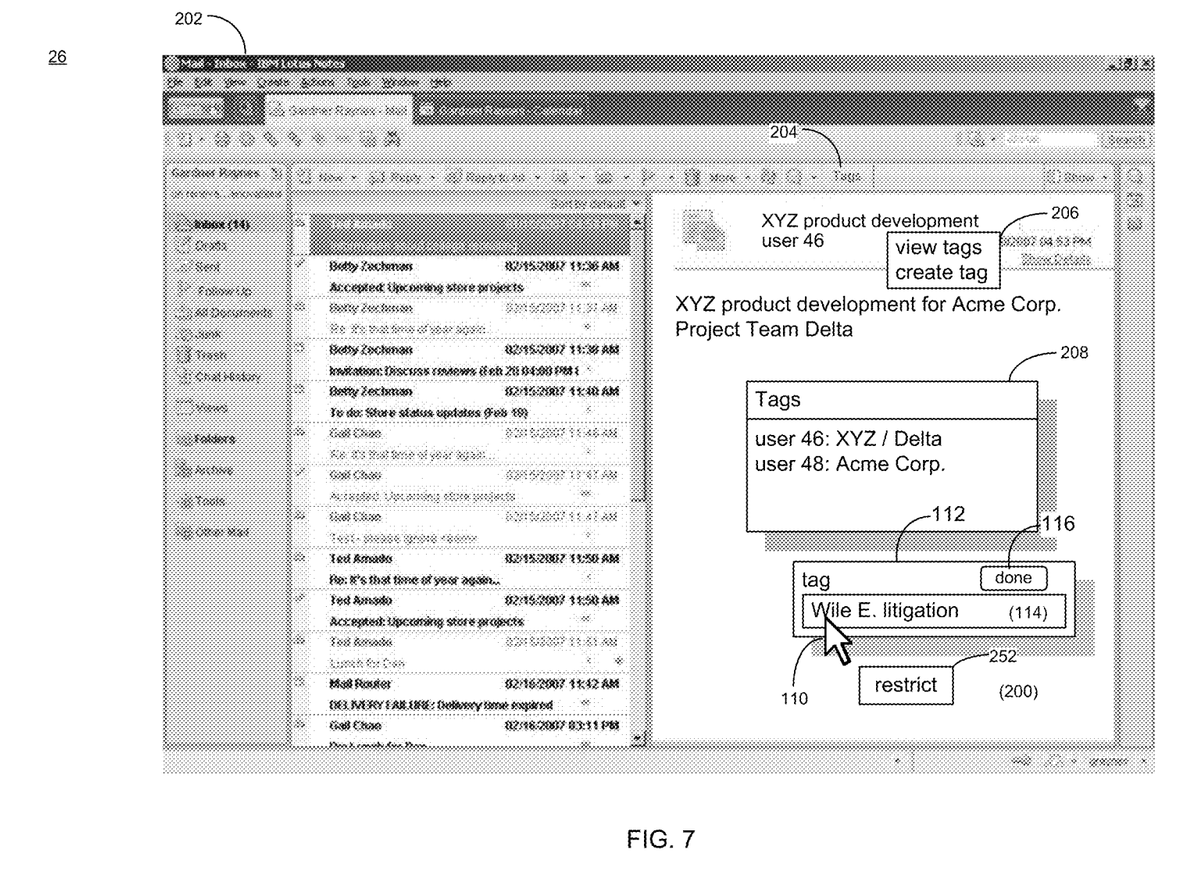
FIG. 7 is a diagrammatic view of an email client interface rendered by the email tagging process, email server application, and/or the email client application of FIG. 1.

Continuing with the above-stated example, and referring also to FIG. 7, user 50 may receive email 200 from user 46, which may be rendered by email client application 26 and/or email server application 20 in email client interface 202. Through email client interface 200, user 50 may read email 200 from user 46. Additionally, user 50 may check to see if any tags have been associated with email 200. For example, user 50 may select "tag" button 204 in email client interface 202 using on-screen pointer 110. Selecting "tag" button 204 may result in tagging process 10, email server application 20, and/or email client application 26 rendering pop-up window 206. While pop-up window 206 is shown to include only two options, namely "view tags" and "create tag", this is for illustrative purposes only and is not intended to be a limitation of this disclosure, as the number of options included within pop-up window 206 may be increased or decreased depending on the design criteria and user need.

As described above, user 50 may select "view tags" option from pop-up window 206 using on-screen pointer 110. As a result of selecting "view tags" option, email tagging process 10, email server application 20, and/or email client application 26 may render tag window 208. Tag window 208 may display the tag "XYZ/Delta" previously created 154, and edited 164 by user 46. Additionally, tag window 208 may indicate that the tag "XYZ/Delta" was created by user 46 (i.e., the tag originator). Tag window 208 may also display tag "Acme Corp." created 154 by user 48, and may indicate that the tag "Acme Corp." was created 154 by user 48 (i.e., the tag originator). Rendering tag window 208 may include updating 158 and retrieving 160, 162 (as appropriate) the tags associated 150 with email 200, as discussed previously.

Making 152 the one or more tags accessible to at least a portion of the one or more email users may include restricting 166 access to at least a portion of the one or more tags by at least a portion of the one or more email users. Continuing with the above-stated example, user 50 may create 154 a tag associated 150 with email 200, e.g., by selecting "create tag" option in pop-up window 206 using on-screen pointer 110. Selecting "create tag" may result in email tagging process 10, email server application 20, and/or email client application 26 rendering pop-up 112 including tag input field 114. Email tagging process 10 may allow user 50 to input the desired tag in tag input field 114. For example, user 50 may be a member of the legal department. As such, user 50 may associate the tag "Wile E. Litigation" with the email pertaining to "Acme Corp.", e.g., indicating user 50's point of interest in email 200

User 50 may wish to restrict access of the tag "Wile E. Litigation" to only those email users belonging to the legal department. Email tagging process 10 may allow users to select the tag "Wile E. Litigation", e.g., by selecting the tag with on-screen pointer 110 and right-clicking the pointing device (e.g., mouse; not shown). Right-clicking on the tag "Wile E. Litigation" may result in email tagging process 10, email server application 20, and/or email client application 26 rendering pop-up window 252. While pop-up window 252 is shown to include only one option, namely "restrict", this is for illustrative purposes only and is not intended to be a limitation of this disclosure, as the number of options included within pop-up window 252 may be increased or decreased depending on the design criteria and user need.

By selecting "restrict" option in pop-up window 252, email tagging process 10 may allow user 52 to restrict 166 access to the tag "Wile E. Litigation" using an appropriate interface (e.g., input field, contacts list, or other suitable interface). As such, email tagging process 10 may allow user 50 to restrict 166 access to the tag "Wile E Litigation" to a portion of the one or more email users. For example, user 50 may restrict access to the tag "Wile E. Litigation" to only those email users within the legal department, to predefined email users, email users within the organization, and so on. Restricting 166 access to the tag "Wile E. Litigation" may result in the tag not being downloaded for email users for whom access is restricted. Additionally/alternatively, the restricted tag "Wile E. Litigation" may be downloaded for email users for whom access is restricted, but the tag may not be viewable. For example, access to the restricted tag may be based upon a public key/private key encryption system The restricted tag may be encrypted and require a proper digital certificate in order to view the restricted tag. Various other arrangements may also be used.

Email tagging process 10 may allow an email user to use the various tags associated with the email 200 (e.g., "XYZ/Delta", "Acme Corp.", and "Wile E Litigation") to, for example, sort, file, or otherwise manage email communications. For example, email tagging process 10 may allow an email user to prioritize at least a portion of the one or more tags associated 150 with an email. Prioritizing at least a portion of the one or more tags may include, for example, prioritizing at least a portion of the one or more tags based upon, at least in part, a tag originator. For example, based upon configuration settings established by, e.g., user 52, or a third party such as a system administrator, email tagging process 10 may prioritize the tags associated 150 with email based upon, at least in part, the tag originator.

Prioritizing at least a portion of the one or more tags associated 150 with an email may allow, for example, a user to search, sort, or prioritize email based upon, at least in part tags associated 150 with emails. For example, a user may search an email directory (e.g., an email inbox) based upon keywords in tags associated 150 with email. Similarly, a user may sort email in an email directory based upon tag originators of tags associated 150 with email. Email may be searched, sorted, prioritized and the like based upon, at least in part, tags associated 150 with email, and or information relating to tags associated 150 with email (e.g., tag originator, tag editors, etc.).

Figure 8:
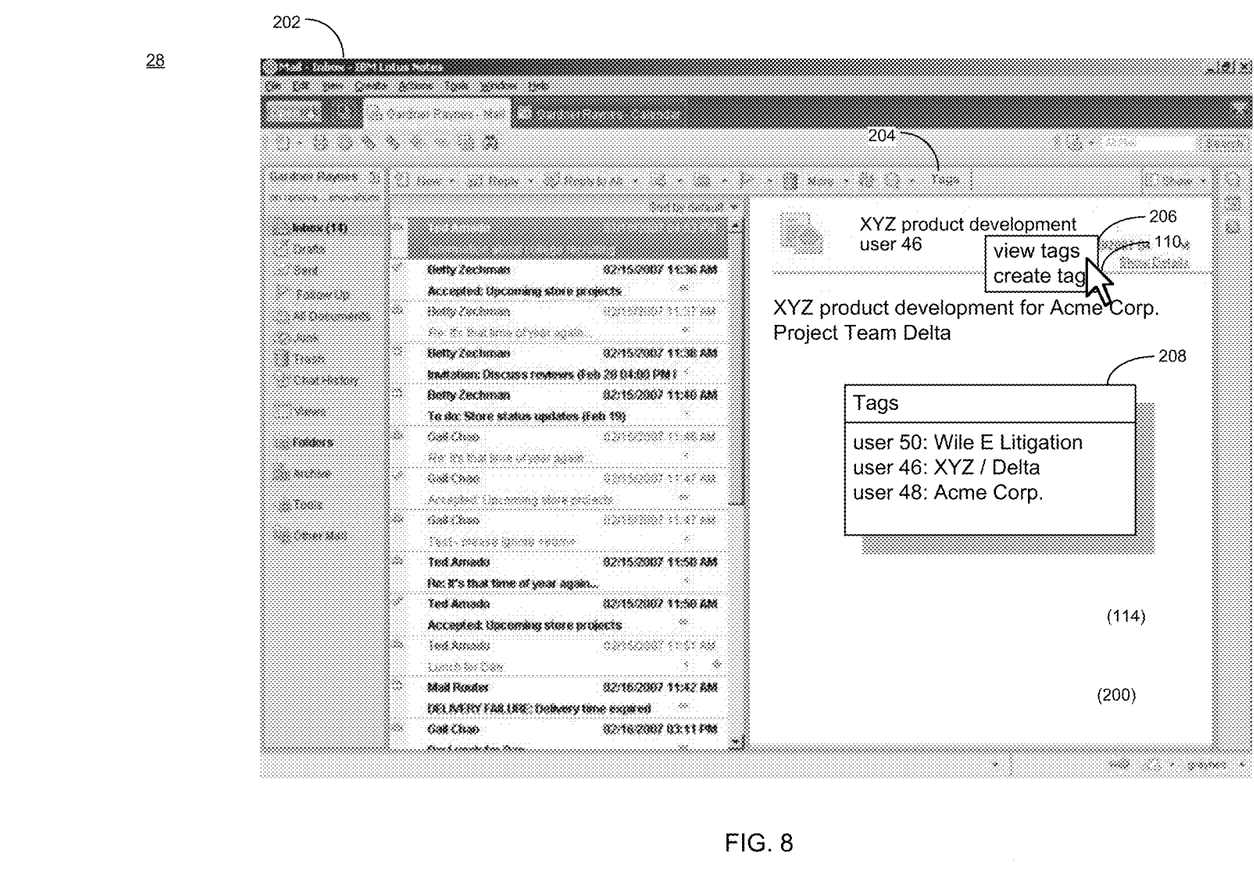
FIG. 8 is a diagrammatic view of an email client interface rendered by the email tagging process, email server application, and/or the email client application of FIG. 1.

Referring also to FIG. 8, user 52 may receive email 200 and email tagging process 10, email server application 20, and/or email client application 28 may allow user 52 to view the tags associated 150 with email 200 (e.g., in the manner discussed above). Email tagging process 10 may prioritize the tags associated 150 with email 200 having a tag originator in the same department as user 52 are displayed first, with tags having an tag originator in a different department, different division, and so on, are displayed in descending order as the organizational distance between user 52 and the tag originator increases. For example, user 50 may be an email user in the same department as user 52 (e.g., in the legal department). As such, email tagging process 10, email server application 20, and/or email client application 28 may display the tag originated by user 50 first in the list of tags. Additionally/alternatively, email tagging process 10 may be configured to prioritize (e.g., reflected by the order of display) the tags based upon a position of the tag originator in an organizational structure. For example, tags originated by user 52's superior may be prioritized above tags originated by subordinates or email user's in a different department. Various other prioritization schemes based upon, at least in part, the tag originator may also be used.

Additionally/alternatively, prioritizing at least a portion of the one or more tags may include prioritizing at least a portion of the one or more tags based upon, at least in part, a content of at least one of the one or more tags. Continuing with the above-stated example, because user 52 is in the legal department, email tagging process 10 may prioritize the tags based upon key words, e.g., litigation. The key words may be based upon, for example, user provided key words, names associated with the user (e.g., in an email contacts list), topics previously searched for by the user, etc.

Consistent with the present disclosure, email tagging process may associate 150 one or more tags with an email and may make 152 the tags available to one or more email users, e.g., including the email sender, as well as all initial and future email recipients. The tags associated 150 with the email may be dynamic, e.g., in that tags may be added and/or edited after the email has been sent. Email users accessing the email after the tags have been added and/or edited may be able to access the added and/or edited tags. As mentioned above, the email tags may be used, for example, for searching email, filing email, prioritizing email, as well as for other purposes.

According to one implementation, the email tags may persist even for emails sent to users outside of an organization and/or using different email applications (e.g., the email tags created in a Lotus Notes™ email application may be accessible to an email recipient using a Microsoft Outlook™ email application). For example, email tagging process 10 may take advantage of extensions points in emails to provide cross-system availability of the tags. Such extension points are provided in email RFC's, and allow for extension of the conventional email standard. In regard to the use of extension points provided in email RFC's, as noted above, tags associated 150 with an email may be embedded with the email. As such, the embedded tags may persist and transfer with the email to both cooperating and non-cooperating email systems. In the case of the latter, the embedded tags may merely remain "silent" (e.g., may not manifest). However, the tag may still be transferred with the email from a non-cooperating email system to a cooperating email system. At which point, the embedded tags may again manifest.

A number of implementations have been described. Nevertheless, it will be understood that various modifications may be made. Accordingly, other implementations are within the scope of the following claims.

What is claimed is:

1. A method comprising:
creating, via an email application, an email to be sent to a plurality of users;
associating, by an email tagging process executing on a computing device, one or more tags to the created email;
sending the created email to the plurality of users;
associating, by the email tagging process executing on the computing device, one or more additional tags with the created email after the email has been sent;
making, by the email tagging process executing on the computing device, the associated tags accessible to at least a portion of one or more email users;
automatically updating, by the email tagging process executing on the computing device, the one or more tags associated with the email, comprising automatically querying one or more email client applications identified as having received the email to identify at least one additional tag associated with the email created by at least one recipient of the email without resending the email;
adding, by the email tagging process executing on the computing device, the at least one additional tag to the one or more tags associated with the email, wherein the at least one additional tag includes a tag originator of the at least one additional tag for display to at least the portion of the one or more email users; wherein permission to add the at least one additional tag is based upon, at least in part, a defined policy and wherein the defined policy is based upon, at least in part, a hierarchical position of a user by reference to a corporate directory; and
prioritizing at least a portion of the one or more tags associated with the email; wherein prioritizing at least a portion of the one or more tags includes at least one of: prioritizing at least a portion of the one or more tags based upon, at least in part, the tag originator; and prioritizing at least a portion of the one or more tags based upon, at least in part, a content of at least one of the one or more tags;
wherein the one or more tags associated with the email persist and transfer with the email using different email applications when sent between a cooperating email system application and a non-cooperating email system application.

2. The method of claim 1, wherein the one or more tags are stored in a tag repository.

3. The method of claim 1, wherein the one or more tags are embedded with the email.

4. The method of claim 1, wherein associating the one or more tags with the email includes editing one or more tags associated with the email.

5. The method of claim 1, wherein making the one or more tags accessible to at least a portion of the one or more email users includes at least one of:
updating the one or more tags associated with the email on a predetermined schedule; and
restricting access to at least a portion of the one or more tags by at least a portion of the one or more email users.

6. A computer program product residing on a non-transitory computer readable medium having a plurality of instructions stored thereon which, when executed by a processor, cause the processor to perform operations comprising:
creating, via an email application, an email to be sent to a plurality of users;
associating, by an email tagging process executing on a computing device, one or more tags to the created email;
sending the created email to the plurality of users;
associating one or more additional tags with the created email after the email has been sent;
making the associated tags accessible to at least a portion of one or more email users;
automatically updating, the one or more tags associated with the email, comprising automatically querying one or more email client applications identified as having received the email to identify at least one additional tag associated with the email created by at least one recipient of the email without resending the email;
adding, by the email tagging process executing on the computing device, the at least one additional tag to the one or more tags associated with the email, wherein the at least one additional tag includes a tag originator of the at least one additional tag for display to at least the portion of the one or more email users; wherein permission to add the at least one additional tag is based upon, at least in part, a defined policy and wherein the defined policy is based upon, at least in part, a hierarchical position of a user by reference to a corporate directory; and
prioritizing at least a portion of the one or more tags associated with the email; wherein prioritizing at least a portion of the one or more tags includes at least one of: prioritizing at least a portion of the one or more tags based upon, at least in part, the tag originator; and prioritizing at least a portion of the one or more tags based upon, at least in part, a content of at least one of the one or more tags;
wherein the one or more tags associated with the email persist and transfer with the email using different email applications when sent between a cooperating email system application and a non-cooperating email system application.

7. The computer program product of claim 6, wherein the one or more tags are stored in a tag repository.

8. The computer program product of claim 6, wherein the one or more tags embedded with the email.

9. The computer program product of claim 6, wherein the instructions for associating the one or more tags with the email include instructions for editing one or more tags associated with the email.

10. The computer program product of claim 6, wherein the instructions for making the one or more tags accessible to at least a portion of the one or more email users include instructions for at least one of:
   updating the one or more tags associated with the email on a predetermined schedule; and
   restricting access to at least a portion of the one or more tags by at least a portion of the one or more email users.

11. The method of claim 1, further comprising:
   storing the one or more tags associated with the email according to different schemes wherein a first tag is stored locally and a second tag is stored in a tag database; and
   rendering the first and second tags in a window.

12. The computer program product of claim 6, further including instructions for:
   storing the one or more tags associated with the email according to different schemes wherein a first tag is stored locally and a second tag is stored in a tag database; and
   rendering the first and second tags in a window.

* * * * *